(12) United States Patent
Saito et al.

(10) Patent No.: US 6,994,388 B2
(45) Date of Patent: Feb. 7, 2006

(54) PICK-UP STYLE UTILITY VEHICLE WITH ADJUSTABLE CARGO BED

(75) Inventors: Hideo Saito, Lincoln, NE (US);
Kazumasa Hisada, Lincoln, NE (US);
Aaron Bahner, Lincoln, NE (US)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/785,201

(22) Filed: Feb. 23, 2004

(65) Prior Publication Data

US 2005/0184548 A1    Aug. 25, 2005

(51) Int. Cl.
*B62D 25/00*    (2006.01)

(52) U.S. Cl. ............... 296/26.1; 296/26.09; 296/26.11; 296/65.09; 296/183.1

(58) Field of Classification Search ............. 296/65.09, 296/26.08, 26.09, 26.11, 183.1, 186.4, 186.5, 296/190.11, 26.1
See application file for complete search history.

(56) References Cited

U.S. PATENT DOCUMENTS

| 3,169,792 | A  | * | 2/1965  | Solano Viquez | 296/99.1   |
|-----------|----|---|---------|---------------|------------|
| 4,480,868 | A  | * | 11/1984 | Koto          | 296/190.11 |
| 6,260,916 | B1 | * | 7/2001  | Hunt          | 296/190.11 |
| 6,398,291 | B1 | * | 6/2002  | Reusswig et al. | 296/186.4 |
| 6,450,566 | B1 | * | 9/2002  | Hong          | 296/190.11 |
| 6,478,355 | B1 | * | 11/2002 | Van Eden et al. | 296/37.6 |
| 6,481,772 | B1 | * | 11/2002 | Tenn          | 296/26.11  |
| 6,517,135 | B2 | * | 2/2003  | de Gaillard   | 296/26.09  |
| 6,550,849 | B1 | * | 4/2003  | Dosdall       | 296/183.1  |
| 6,786,535 | B1 | * | 9/2004  | Grzegorzewski et al. | 296/190.11 |

* cited by examiner

*Primary Examiner*—Joseph D. Pape
(74) *Attorney, Agent, or Firm*—Alleman Hall McCoy Russell & Tuttle LLP (57) ABSTRACT

A pick-up style utility vehicle is provided. Typically, the vehicle includes a seat that is retractable into a leg space of the seat, and a cargo bed adjustably provided behind the seat such that a part of the cargo bed is moveable into a space formerly occupied by the seat after the seat is retracted. In this manner, cargo space and passenger space of the vehicle may be selectively optimized by the user.

14 Claims, 7 Drawing Sheets

PICK-UP STYLE UTILITY VEHICLE WITH ADJUSTABLE CARGO BED

TECHNICAL FIELD

The present invention generally relates to a pick-up style utility vehicle with an adjustable cargo bed, and more particularly relates to a pick-up style utility vehicle with an adjustable cargo bed and a movable seat that the user may selectively position to optimize cargo space and passenger space.

BACKGROUND OF THE INVENTION

Pick-up style utility vehicles are typically characterized by a cargo bed located behind one or more rows of seats, each row having one or more seats. Each seat typically has a leg area positioned immediately in front of the seats, such that a person may ride in a sitting position. A steering wheel is typically positioned above the leg area of one of the seats. Pick-up style utility vehicles may be contrasted with other utility vehicles such as all-terrain vehicles (ATVs), which have a seat that is straddled by a rider and a handle bar for steering. Pick-up style utility vehicles are used for a wide variety of off-road utility applications, such as moving materials including lumber, farm and ranch tasks, golf course maintenance, hunting, etc.

Prior pick-up style utility vehicles with two rows of seats generally suffer from the drawback that less cargo may be accommodated, since the cargo bed must typically be shortened to allow room for an additional row of seats. Prior pick-up style utility vehicles with only one row of seats are typically equipped with larger cargo beds, but cannot accommodate a larger number of passengers. Thus, users that occasionally carry a large number of passengers, and occasionally carry large loads find that they cannot accomplish both tasks well with the same vehicle.

BRIEF SUMMARY OF THE INVENTION

A pick-up style utility vehicle with an adjustable cargo bed is provided. According to one aspect of the invention, the utility vehicle includes a seat provided retractable into a leg area of the seat, and a cargo bed adjustably provided behind the seat such that a part of the cargo bed is moved into an area formerly occupied by the seat after the seat is retracted. The leg area may be in front of and/or below the seat. The seat may be at least a rearmost one of a plurality of seats disposed in a tandem manner.

The cargo bed may be of a rectangular shape, and have a bottom plate and a surrounding panel assembly including a front panel and a pair of side panels provided along a perimeter of the bottom plate. The bottom plate may be extended to underneath the seat, and the front panel may be located behind the seat when the seat is not retracted and is configured to be extendable forward to reach into where the seat has been located after the seat is retracted.

The front panel may be rotatably provided on a vertical axis to extend forward to reach into the area formerly occupied by the seat after the seat is retracted. The vertical axis may be provided at a front end of the side panel.

The surrounding panel assembly may include a side panel slidably provided along a side, and may be configured to extend forward to reach into the area formerly occupied by the seat after the seat is retracted.

The utility vehicle may further comprise a screen shield detachably provided to a front portion of the cargo bed. The cargo bed may be constructed to accommodate the screen shield in an extended part thereof to allow the screen shield to serve as the front panel.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Figure 1:
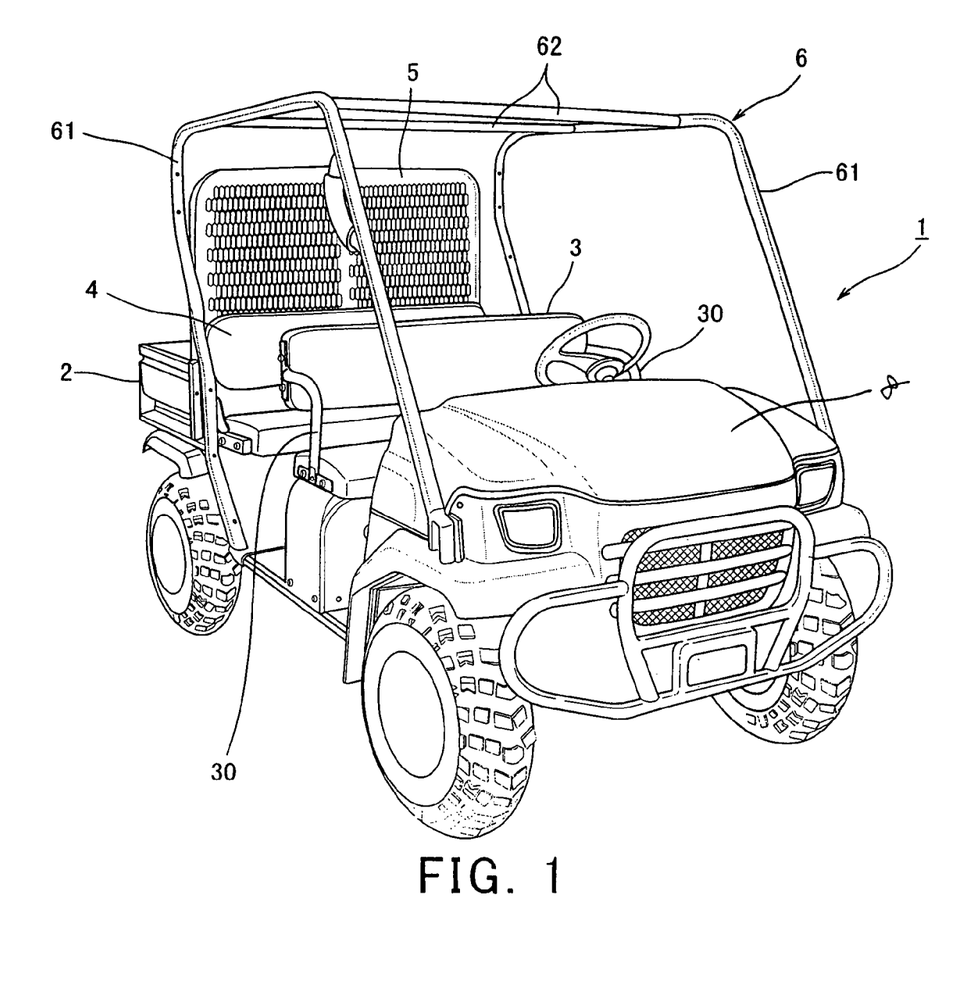
FIG. 1 is a perspective view of a pick-up style utility vehicle with an adjustable cargo bed according to one embodiment of the present invention.

FIG. 1 is a perspective view of a pick-up style utility vehicle 1 according to one embodiment of the present invention. The vehicle typically has a body coupled to four rotatable wheels, and one or more rows of seats, each row having one or places for a person to sit. Vehicle 1 typically includes a front seat 3, which is typically a bench seat configured to accommodate up to two persons, one side of which is used as a driver's seat and the other side of which may be used as a passenger's seat. Vehicle 1 typically further includes a rear seat 4, which is also typically a bench seat configured to accommodate two passengers. Thus vehicle 1 typically may accommodate up to four persons in total. Of course, the above embodiment is merely illustrative, end it will be appreciated that various other seat configurations maybe provided. For example, each of the front and rear rows of seats may include pairs of individual seats, rather than bench seats, or each of the rows of seats may only be designed to accommodate one passenger. Behind the rear seat 4, there is provided a cargo bed 2. Cargo bed 2 is typically rectangular in shape, and includes a surrounding panel assembly formed around its perimeter, the surrounding panel assembly including a front panel and side panels. Alternatively, the cargo bed may be of another suitable polygonal or curved shape for holding cargo. A divider 5 is attached to the foremost end of the cargo bed 2 to separate the rear seat 4 from the cargo bed 2. Typically, the divider 5 is a meshed screen shield. Alternatively, the divider 5 may be a non-meshed panel or other suitable dividing structure.

A cabin frame 6 is provided over the seats, and defines a cabin space for the driver and passengers. The cabin frame 6 includes a pair of side bars 61 provided on the right and left sides of the vehicle body to define side face of the vehicle 1. Typically the side bars arc from the front to the rear of the vehicle to define a passageway through which passengers may enter and exit seats 3, 4. A front portion of each side bar typically attaches to the vehicle body at a respective mounting location adjacent a right or left side of a hood 8 of the vehicle, and extends rearwardly and upwardly to a roof. The roof is typically substantially flat, and defined by a middle portion of each of the side bars and a plurality of transverse bars 62 stretching between the side bars. The roof is typically formed to provide sufficient bead room for any passengers seated in seats 3, 4. A rear portion of each of the side bars extends downward from the roof and attaches to the vehicle body adjacent the rear seat 4. Arm bars 30 may also be provided adjacent a right and left side of seat 3, and typically mount a seat back to a seat base of seat 3. Alternatively, a cabin may be formed in another shape suitable to hold passengers.

Figure 2A:
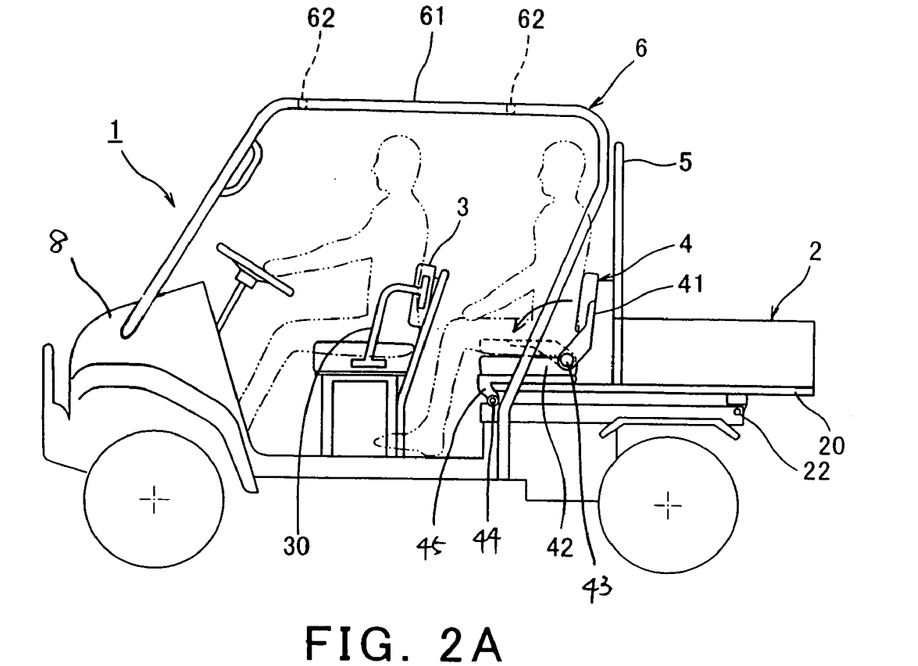
FIG. 2A is a schematic left side view of the FIG. 1 with the vehicle's rear seat occupied by passenger(s)
Figure 2B:
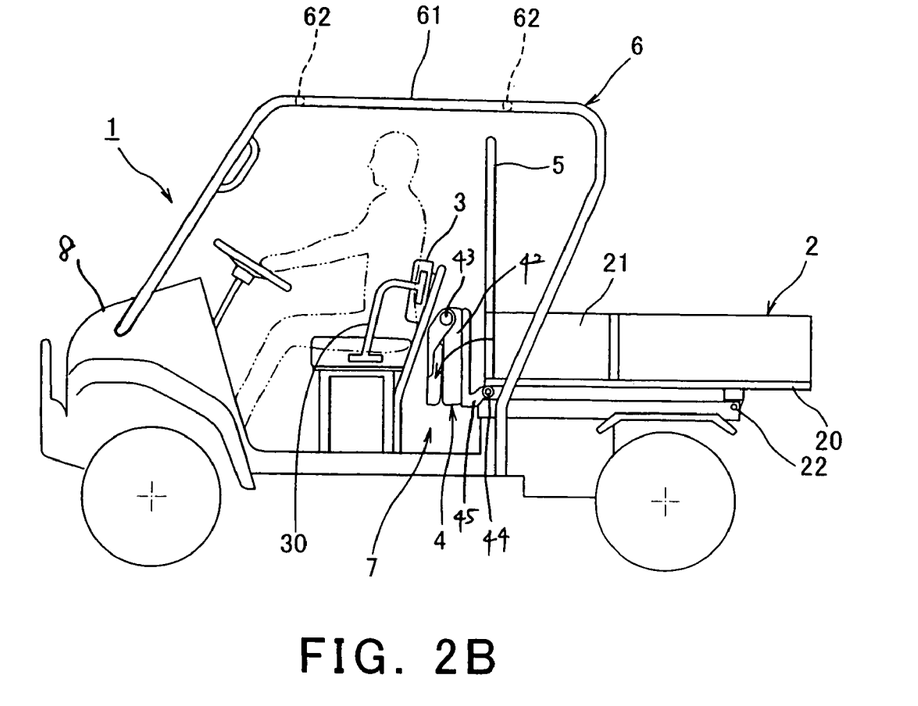
FIG. 2B is a view of the utility vehicle of FIG. 2A, showing the rear seat retracted and the cargo bed extended.

As shown in broken lines in FIGS. 2A and 2B, rear seat 4 is coupled to the body of the vehicle in a manner that enables the rear seat to be movable between a stowed configuration, shown in FIG. 2B, and a deployed configuration shown in FIG. 2A. The rear seat 4 typically includes a bottom portion 42 upon which one or more passengers may sit, and a backrest portion 41 configured to support each passenger's back. The bottom portion 42 is typically supported in the deployed configuration by a bottom plate 20 of the cargo bed. A lower end of the backrest portion 41 is typically pivotably mounted by a pivot 43 to a rear end of bottom portion 42, such that the backrest portion may be folded forward by a user to lie in a substantially flat intermediate position, shown in dashed lines in FIG. 2A. Further, a front end of the bottom portion 42 is hinged to the vehicle body so us to be rotatable around a pivot 44. Typically, the bottom portion 42 is connected to the pivot 44 through an arm 45 extending downwardly from the front end of the bottom portion 42, so that a bottom surface of the bottom portion 42 is moved to a location forward of the pivot 44 when retracted. Thus, the rear seat 4 can be moved from to intermediate position to the stowed configuration, shown in FIG. 2B, in which the entire rear seat 4 is retracted into a leg space 7 of the vehicle. The leg space is typically defined as a space in front of and/or below the rear seat 4 in the deployed configuration, where a passenger might rest his or her legs while riding in the vehicle.

In this embodiment, cargo bed 2 is configured to be extendable forward into a space at least partially occupied by the rear seat 4 when the rear seat was in the deployed configuration, as described in more detail hereinafter. The divider 5 may be manually removed from the cargo 2 and reattached to a foremost end of an extendable portion 21 of the cargo bed 2, to enable the divider 5 to be repositioned from a position adjacent the forward end of the cargo bed in a retracted configuration to a position adjacent the forward end of the cargo bed in an extended configuration.

Thus, a user who desires to carry a large load rather than passengers in the rear seat 4, may move to rear seat from the deployed to the stowed configuration, thereby freeing the space formerly occupied by the rear seat in the deployed configuration. This may be accomplished by folding down the backrest portion 41 to the intermediate position, and pivoting the bottom portion 42 with the folded backrest portion 41 into the stowed configuration in leg space 7. Once the rear seat 4 is in the stowed configuration, the user may remove the divider 5 from the cargo bed 2, and extend the extendable portion 21 of the cargo bed 2 from the retracted configuration to the extended configuration, into the space freed by moving the rear seat 4. The user typically may accomplish this by extending the sides of the cargo bed, by pivoting or sliding the extendable portion 21, as discussed below. Once the cargo bed is in the extended configuration, the user may reattach the divider 5 adjacent a forward end of the cargo bed 2 in the extended configuration, thereby providing extended cargo space for the large load.

Figure 3A:
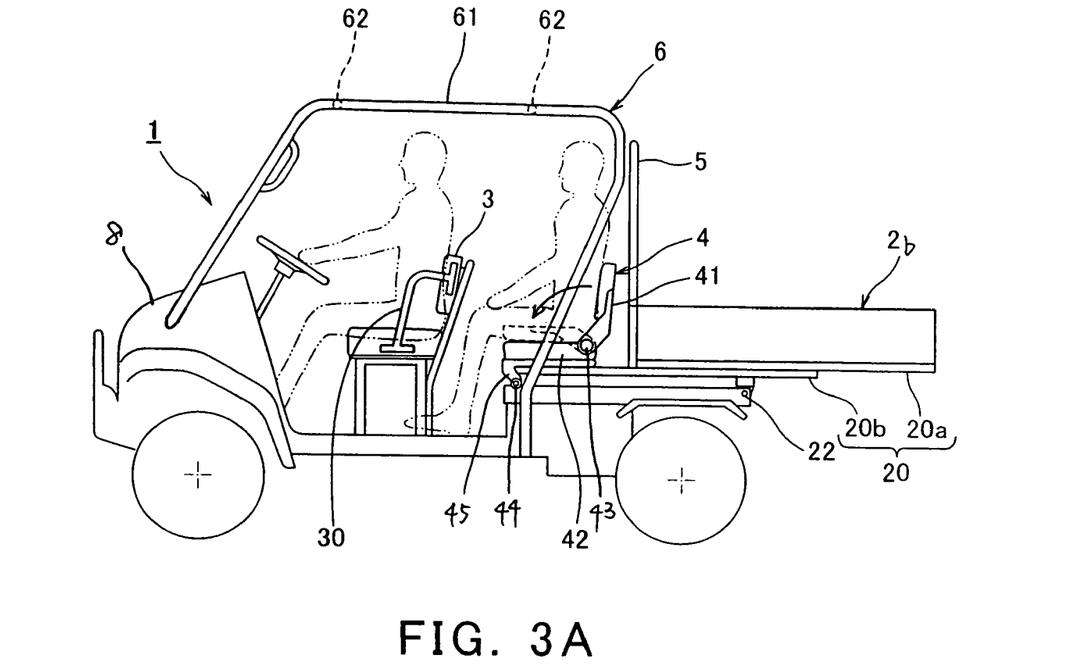
FIG. 3A is a schematic left side view of the utility vehicle of another embodiment according to the present invention with the vehicle's rear seat occupied by passenger(s)
Figure 3B:
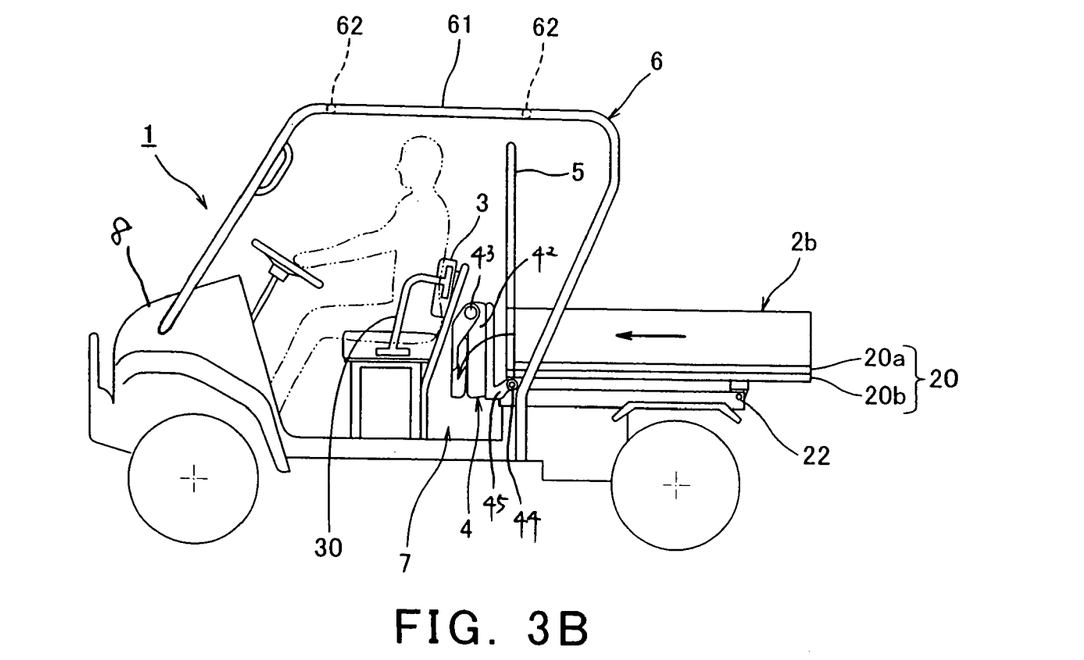
FIG. 3B is a view of the utility vehicle of FIG. 3A, showing the rear seat retracted and the cargo bed moved forward.

According to another embodiment of the present invention, shown in FIGS. 3A and 3B, utility vehicle 1 may include a relatively large cargo bed 2b which is slidably attached to the vehicle body, such that the cargo bed may be moved between a first configuration, also referred to as an overhang configuration, shown in FIG. 3A, in which a rear end of the cargo bed overhangs the rear wheels of the vehicle to a greater extent, and a second configuration, also referred to as a compact configuration, shown in FIG. 3B, in which the rear end of the cargo bed overhangs the rear wheels of the vehicle to a lesser extent than the first configuration, and in which the forward end of the cargo bed is positioned in the space formerly occupied by the rear seat in the deployed configuration. The bottom plate 20 of the cargo bed 2b typically includes an upper bottom plate 20a and a lower bottom plate 20b, which are slidable relative to each other along a longitudinal direction of the vehicle, to thereby enable the cargo bed to move between the first and second configurations.

A portion of the tower bottom plate 20b is positioned beneath the bottom portion 42 of the rear seat 4 to stably hold the bottom portion 42 thereon when the entire rear seat 4 is not retracted. Typically, this embodiment is manufactured using substantially the same chassis as the embodiment shown in FIGS. 2A and 28, and only the structure of the cargo bed differs between the embodiments.

With this configuration, even when the rear seat 4 is occupied by one or more passengers, the cargo bed 2b can carry a large load. However, in this embodiment, since an upper part of the cargo bed 2b, excluding lower bottom plate 20b, protrudes to the rear of vehicle 1 well over a pivot 22 around which the entire cargo bed 21, can be tilted for unloading when unlocked, a load in a rear portion of the cargo bed 2b creates a moment around the pivot 22. Therefore, as shown in FIG. 3B, the upper part of the cargo bed 2b is formed to be manually slid forward with respect to the lower bottom plate 20b until a front portion of the upper part of the cargo bed 2b reaches a location formerly occupied by the deployed rear seat 4. In this embodiment, while cargo bed 2b is not typically configured to be adjustable in size, a relatively large cargo bed may be provided, which may be moved into the overhang configuration to accommodate passengers, or into the compact configuration when the rear seat is stowed.

Figure 4A:
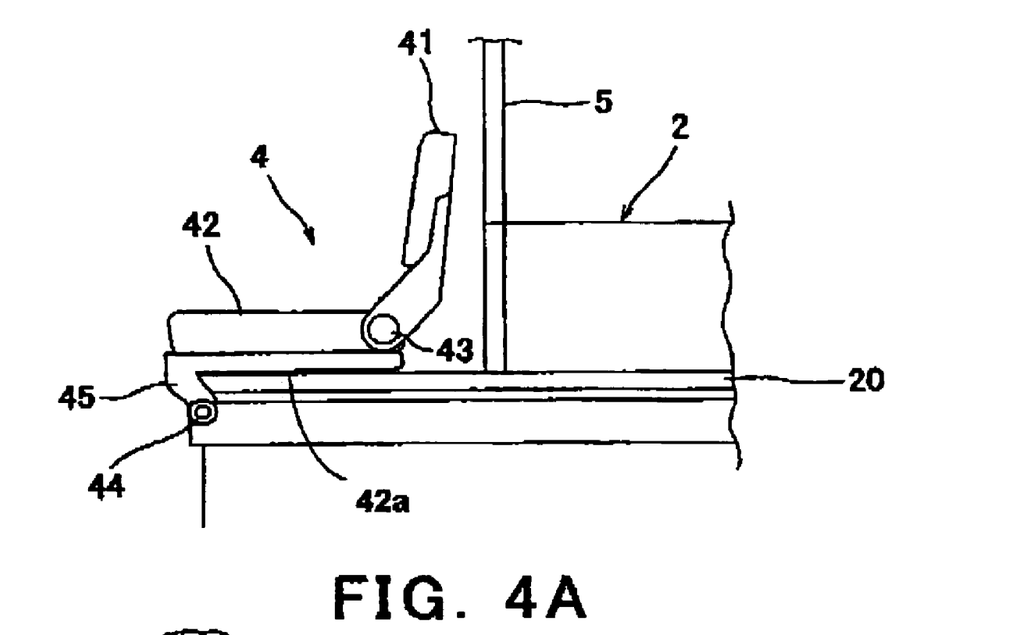
FIG. 4A is a partial schematic view of the utility vehicle in the configuration shown in FIG. 2A, showing the rear seat in the deployed configuration.
Figure 4B:
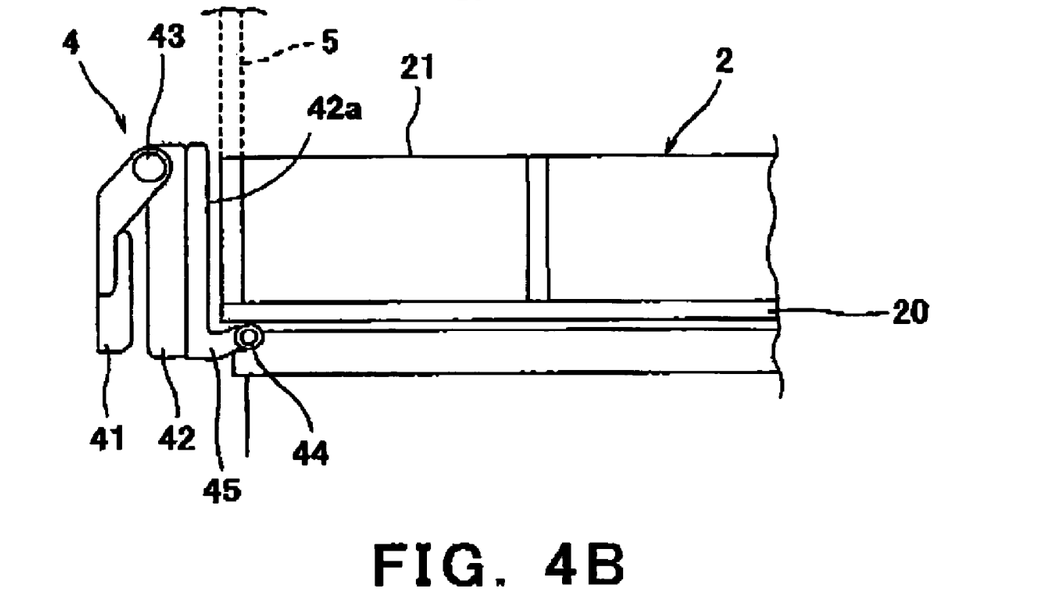
FIG. 4B is a partial schematic view of the utility vehicle in the configuration shown in FIG. 2B, showing the rear seat in the stowed configuration, in which a bottom of the rear seat is positioned adjacent a front panel of the cargo bed.

Returning to the embodiment discussed with respect to FIGS. 2A and 2B, it will be appreciated tat the rear seat 4 may be utilized as the front panel for the cargo bed 2. As shown in detail in FIG. 4A, the rear seat 4 may be pivotably mounted to the vehicle's body. As shown in FIG. 4B, the rear seat 4 may be manually retracted to the stowed configuration such that the bottom surface 42a of the bottom portion 42 of the rear seat 4 covers a front opening of the cargo bed 2, and the rear seat 4 is locked to the position by an appropriate locking mechanism (not shown). In this example, the rear seat 4 serves as the front panel of the cargo bed 2 and, thus, typically no divider 5 is installed. However, the divider 5 may be attached to the extendable portion 21 of the cargo bed 2, if desired.

Figure 5A:
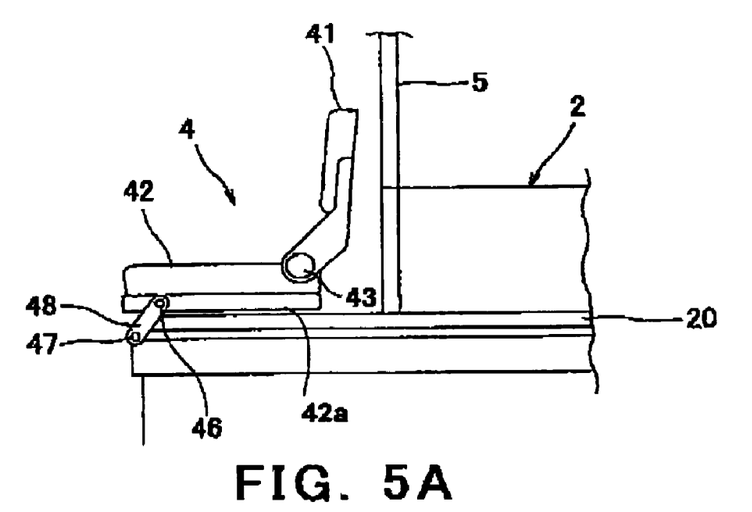
FIG. 5A is a partial schematic view of the utility vehicle shown in the configuration shown in FIG. 2A, showing the rear seat in a deployed configuration.
Figure 5B:
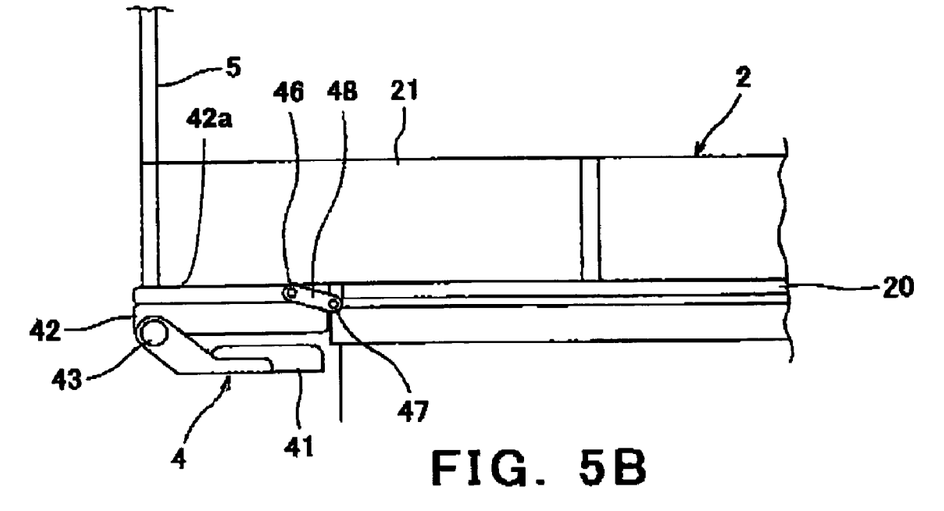
FIG. 5B is a partial schematic view of to utility vehicle in the configuration shown in FIG. 2B, showing the rear seat in a stowed configuration, in which a bottom of the rear seat is positioned adjacent a bottom plate of the cargo bed.

According to another embodiment of the present invention, shown in FIGS. 5A and 5B, rear seat 4 is configured to be movable to the stowed configuration in which the bottom surface 42a is substantially parallel and positioned upside down in front of bottom plate 20, such that a portion of the cargo bed 2 (such as extendable portions 21) may rest upon the bottom surface 42a of the rear seat 4. As shown in FIG. 5A, the rear seat 4 is hinged to the vehicle body utilizing a hinge 48 having two pivots 46, 47. As shown in FIG. 5B, the entire rear seat 4 can be manually retracted to an upside-down configuration into leg space 7, and the rear seat 4 may be locked to the position by an appropriate locking mechanism (not shown). Therefore, the entire bottom portion 42 is moved in front of the pivot 47 when in the retracted configuration, so that the bottom surface 42a of the bottom portion 42 and the foremost part of the bottom plate 20 of the cargo bed 2 form a substantially continuous plane.

Figure 6:
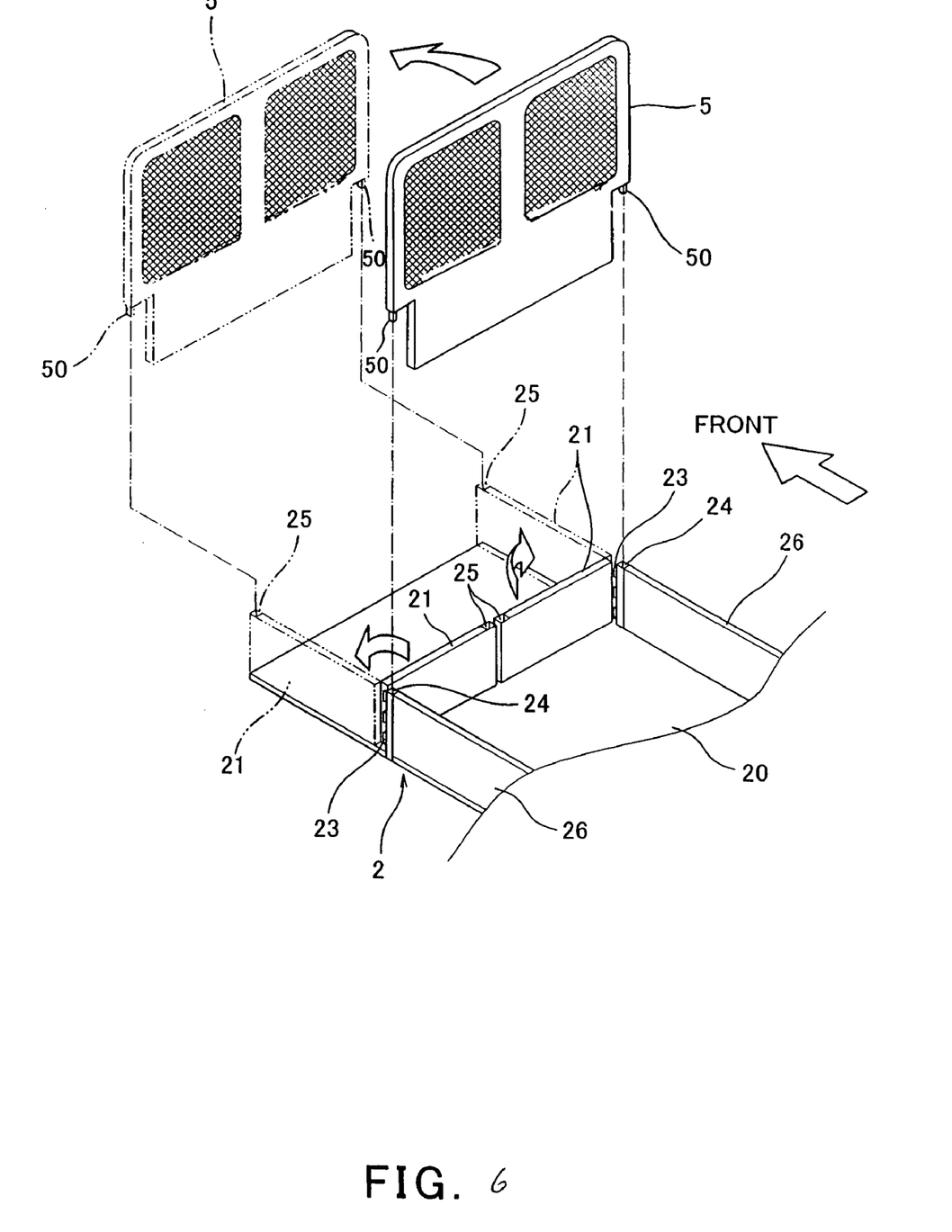
FIG. 6 is a perspective view of the cargo bed of FIGS. 2A and 2B, showing extendable portions of the cargo bed according to one embodiment of the present invention, the extendable portions being configured to rotatably extend from a retracted configuration in which the portions border a front panel of the cargo bed, to an extended configuration in which the extendable portions form side panels of the cargo bed.
Figure 7:
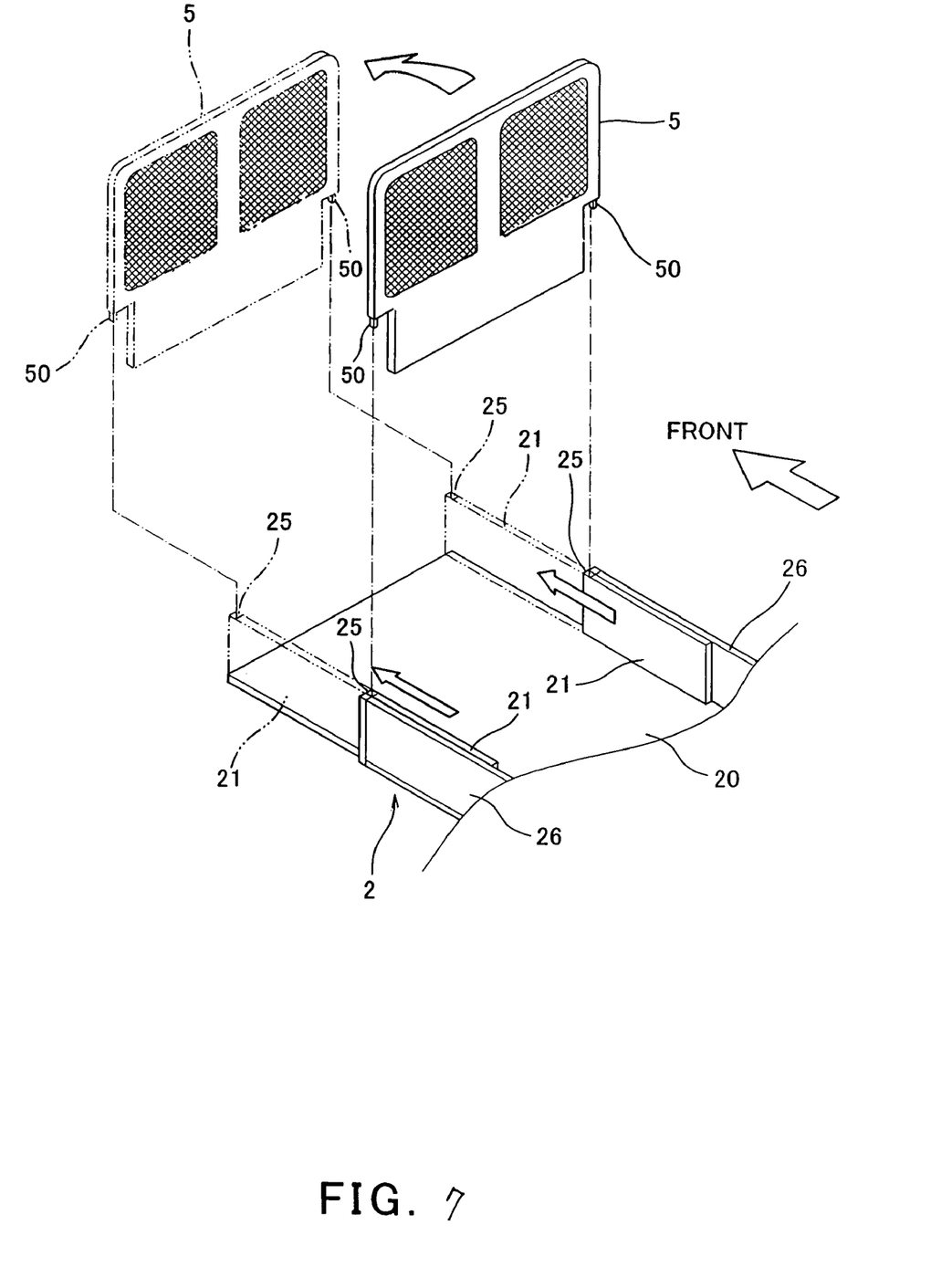
FIG. 7 is a perspective view of a cargo bed of FIGS. 2A and 2B, extendable portions of the cargo bed according to another embodiment of the present invention, in which the extendable portions are configured to slide from a retracted position to an extended position along the sides of the cargo bed.

The extension of the cargo bed 2 maybe achieved as shown in FIGS. 6 and 7. FIG. 6 shows the extendable portions 21 serving as the front panel of cargo bed 2 when the extendable portions 21 are in the retracted configuration. Each of the extendable portion 21 is hinged at a proximate end by hinges 23 to a front end of a respective side panel 26. Each of the extendable portions 21 typically has a length of approximately a half of the width of the cargo bed 2. The extendible portions 21 maybe moved from the retracted configuration in which they serve as the front panel, as illustrated with solid lines in FIG. 6, by pivoting the extendible portions 21 around the hinges 23 approximately 90 degrees to the extended configuration illustrated with two-dot-chain lines in FIG. 6.

As also shown in FIG. 6, an opening 24 (typically square) is formed so as to be opened upwardly at the front end of each of the side panels 26. The divider 5 is typically substantially a rectangular shape and its upper part has a width corresponding to the distance between outer surfaces of the side panels 26. The lower part of the divider 5 is narrowed to correspond the distance between inner surfaces of the side panels 26. Typically, the upper part of the divider 5 is meshed and the meshed portion is divided in two at the middle thereof, to leave a solid rib therebetween to add strength to the divider 5. Bosses 50 are provided to the upper end of the narrowed section of the divider 5 so as to protrude downwardly. The divider 5 is attached to the front ends of the side panels 26 that the bosses 50 are inserted into the openings 24 formed in the side panels 26 when the extendable portions 21 are retracted to be the front panel of the cargo bed 2. The extendable portions 21 also have upwardly-opened openings 25 of the same shape and size as the openings 24 of the side panels 26, at opposing ends.

Accordingly, when user wants to extend the cargo space, the user pulls out the divider 5 from the openings 24 of the side panels 26. Then, the user rotates each of the extendable portions 21 from the solid-lined retracted configuration to the two-dot-chain-lined extended configuration, each rotating approximately 90 degrees. The user then reattaches the divider 5 to the openings 25 of the extendable portions 21. Here, the narrowed lower section of the divider 5 is configured to reach down to the upper surface of the bottom plate 20 so that it also serves as the front panel of the cargo bed 2 when the extendable portions 21 are extended.

The extension of the cargo bed 2 may also be achieved as shown in FIG. 7. In this example, the extendable portions 21 are provided so as to slide relative to the side panels 26 of the cargo bed 2 in a longitudinal direction of the vehicle. The extendable portions 21 maybe provided to the bottom plate 20 or the side panels 26 trough an appropriate sliding means such as a combination of rollers and rails. In this example, the extendable portions 21 typically do not serve as the front panel of the cargo bed 2 since they are forwardly extendable to the extended configuration (as shown wit two-dot-chain lines in FIG. 7) from the retracted configuration (as shown with solid lines in FIG. 7). Instead, in this example, the narrowed lower section of the screen shield 5 serves as the front panel of the cargo bed 2 when the extendable portions 21 are extended as described above. To achieve this, the extendable portions 21 have the upwardly-opened openings 25 at foremost ends to accommodate the bosses 50 of the divider 5. In this example, the divider 5 may be fixed to the extendable portions 21 and moved with the extendable portions 21, since a distance between the openings 25 does not change during the slide movement of the extendable portions 21.

In the above embodiments, it has been described that backrest portion of the bench-type rear seat is foldable to provide the space for the cargo bed, however, it will be appreciated by those skilled in the art that only a section thereof may be foldable and moveable between the deployed and retracted configurations, or the rear seat may have a plurality of independently stowable and deployable sections. In addition, while a two-seat type vehicle has been illustrated, it will be appreciated that the present invention is also applicable to utility vehicles with only one seat, in which the seat's backrest portion on a passenger's side is independently foldable relative to the driver's side. Further, while bench seats have been illustrated, it will be appreciated that the present invention is applicable to utility vehicles of a non-bench-seat type in which the passenger's seat is foldable and the entire passenger's seat is independently formed from the driver's seat. Further, as described above, it will also be appreciated by those skilled in the art that the present invention is also applicable to utility vehicles with three or more rows of seats.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A pick-up style utility vehicle, comprising:
   a plurality of seats disposed in a tandem manner, wherein at least a rearmost one of the plurality of seats is configured to be retractable into a leg space of the seat, the leg space being defined as a space in front of the seat; and
   a cargo bed provided behind the plurality of seats;
   wherein the cargo bed is of a rectangular shape, and includes a stationary bottom plate that extends forward from a rear end part of the cargo bed to underneath the rearmost seat substantially at the same level in height to form a bottom plate of an extended portion of the cargo bed with a portion of the stationary bottom plate underneath a rearmost seat, and further includes a surrounding panel assembly, wherein the surrounding panel assembly includes side panels provided along opposing side perimeters of the bottom plate and an extendable portion; and
   wherein the extendable portion is configured to be extendable forward to reach into the space formerly occupied by the seat after the seat is retracted so as to form an extended part of the side panels.

2. The pick-up style utility vehicle of claim 1, wherein-the extendable portion of the side panel is rotatably provided on a vertical axis provided at a front end of the side panel to extend forward to reach into the space formerly occupied by the seat after the seat is retracted.

3. The pick-up style utility vehicle of claim 1, wherein the extendable portion of the side panel is slidably provided along a side of the side panel to extend forward to reach into the space formerly occupied by the seat after the seat is retracted.

4. A pick-up style utility vehicle, comprising:
   a body;
   a seat coupled to the body, the seat being movable between a stowed configuration and a deployed configuration; and
   a cargo bed including an upper bottom plate and a lower bottom plate coupled to the body;
   wherein the-upper bottom plate is-slidable on the lower bottom plate from an overhang configuration in which a forward end portion of the upper bottom plate is positioned behind the seat and a rear end portion thereof overhangs rear wheel of the vehicle to a greater extent when the seat is in the deployed configuration to a compact configuration in which the forward end portion of the upper bottom plate is positioned in a space formerly occupied by the seat in the deployed configuration and the rear end portion of the upper bottom plate overhangs the rear wheels of the vehicle to a lesser extent-than in the overhang configuration when the seat is in the stowed configuration.

5. The pick-up style utility vehicle of claim 1, wherein the seat includes a bottom portion pivotably mounted to a body of the vehicle and a backrest portion pivotably mounted to a rear end of the bottom portion.

6. The pick-up style utility vehicle of claim 1, wherein the seat includes a bottom portion pivotably mounted to a body of the vehicle and a backrest portion pivotably mounted to a rear end of the bottom portion, and is configured to be turned a bottom surface of the bottom portion upside-down so that the bottom surface and a foremost part of the bottom plate form substantially a continuous plane with the bottom surface of the bottom portion when the entire seat is retracted.

7. The pick-up style utility vehicle of claim 1, further comprising a screen shield detachably provided to front portions of the side panels when the extendable portions are not extended, wherein the extendable portions are constructed to accommodate the screen shield to allow the screen shield to serve as a front panel of the surrounding panel assembly when the extendable portions are extended.

8. The pick-up style utility vehicle of claim 2, wherein the extendable portions of the side panels are constructed to serve as the front panel when the extendable portions are not extended.

9. The pick-up style utility vehicle of claim 3, further comprising a screen shield detachably provided to front portions of the extendable portions of the side panels to allow the screen shield to serve as the front panel both when the extendable portions are extended and not extended.

10. The pick-up style utility vehicle of claim 1, wherein an entire upper surface of the bottom plate is substantially formed with a horizontally flat surface.

11. The pick-up style utility vehicle of claim 4, wherein the seat includes a bottom portion having a pivot provided at a front end thereof, the bottom portion being pivotably mounted to the body of the vehicle around the pivot, and a backrest portion pivotably mounted to a rear end of the bottom portion at a lower end thereof; and
    wherein the deployed configuration is defined as a configuration in which the bottom portion is oriented substantially horizontal and the backrest portion is oriented substantially upright, and the stowed configuration is defined as a configuration in which the backrest portion is folded forward over the bottom portion and the bottom portion is retracted while the backrest portion being folded so that the bottom portion and the backrest portion are located substantially in front of the pivot of the bottom portion.

12. A pick-up style utility vehicle, comprising:
    a seat provided retractable into a leg space of the seat; and
    a cargo bed adjustably provided behind the seat such that a part of the cargo bed is moved into an area formerly occupied by the seat after the seat is retracted;
    wherein the cargo bed is of a rectangular shape, and includes a bottom plate and a surrounding panel assembly provided along a perimeter of the bottom plate;
    wherein the bottom plate extends underneath the seat, and a portion of the surrounding panel assembly is located behind the seat when the seat is not retracted and is configured to be extendable forward to reach into the area formerly occupied by the seat after the seat is retracted; and
    wherein the surrounding panel assembly includes a front panel and a side panel, and the portion of the surrounding panel assembly is the front panel, the front panel being rotatably provided on a vertical axis provided at a front end of the side panel to extend forward to reach into the area formerly occupied by the seat, after the seat is retracted.

13. A pick-up style utility vehicle, comprising:
    a seat provided retractable into a leg space of the seat;
    a cargo bed adjustably provided behind the seat such that a part of the cargo bed is moved into an area formerly occupied by the seat after the seat is retracted; and
    a screen shield detachably provided to a front portion of the cargo bed;
    wherein the cargo bed is of a rectangular shape, and includes a bottom plate and a surrounding panel assembly provided along a perimeter of the bottom plate;

wherein the bottom plate extends underneath the seat, and a portion of the surrounding panel assembly is located behind the seat when the seat is not retracted and is configured to be extendable forward to reach into the area formerly occupied by the seat after the seat is retracted; and wherein the cargo bed is constructed to accommodate the screen shield in an extended part thereof to allow the screen shield to serve as the front panel.

14. The pick-up style utility vehicle of claim 5, wherein a lower end portion of the backrest portion of the seat is pivotably mounted to a rear end portion of the bottom portion of the seat, and wherein a forward end portion of the bottom portion of the seat is hinged to the body of the vehicle; and wherein the seat is configured to be stowed to create an extended cargo space by rotating the backrest portion from an upright position to a lowered position in which a front surface of the backrest portion faces an upper surface of the bottom portion of the seat, and by further rotating forward the backrest and bottom portions of the seat together until a bottom surface of the bottom portion faces rearward and is positioned forward of the bottom plate.

\* \* \* \* \*